US006649279B2

(12) United States Patent
Migliorini et al.

(10) Patent No.: US 6,649,279 B2
(45) Date of Patent: Nov. 18, 2003

(54) MONOWEB METALLIZED FILM SUITABLE FOR DIRECT SURFACE PRINTING

(75) Inventors: Robert A. Migliorini, North Haven, CT (US); Larry A. Parr, Canandaigua, NY (US); William M. Mallory, Pittsford, NY (US); Wayne Robert Osgood, Jr., Farmington, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 26 days.

(21) Appl. No.: 09/867,980

(22) Filed: May 30, 2001

(65) Prior Publication Data

US 2002/0182435 A1 Dec. 5, 2002

(51) Int. Cl.$^7$ ................. B32B 15/08; B32B 15/20; B32B 27/16; B32B 27/38
(52) U.S. Cl. ................. 428/626; 428/336; 428/458; 428/461; 428/516
(58) Field of Search .................. 428/626, 215, 428/216, 332, 336, 457, 458, 460, 461, 462, 469, 515, 500, 516, 423.1, 425.8, 463, 476.3

(56) References Cited

U.S. PATENT DOCUMENTS

| 4,214,039 A | | 7/1980 | Steiner et al. ............... 428/414 |
| 4,927,689 A | | 5/1990 | Markiewicz ............... 428/34.8 |
| 4,944,990 A | | 7/1990 | Liu et al. .................... 428/353 |
| 4,975,315 A | * | 12/1990 | Bothe et al. ................ 428/216 |
| 5,194,318 A | | 3/1993 | Migliorini et al. .......... 428/215 |
| 5,230,963 A | | 7/1993 | Knoerzer .................... 428/520 |
| 5,346,763 A | * | 9/1994 | Balloni et al. .............. 428/349 |
| 5,425,996 A | * | 6/1995 | Wilkie et al. ............... 428/461 |
| 5,525,421 A | | 6/1996 | Knoerzer .................... 428/347 |
| 5,547,764 A | | 8/1996 | Blais et al. ................. 428/461 |
| 5,591,520 A | * | 1/1997 | Migliorini et al. .......... 428/347 |
| 5,667,902 A | | 9/1997 | Brew et al. ................. 428/518 |
| 5,827,615 A | | 10/1998 | Touhsaent et al. .......... 428/463 |
| 5,885,721 A | | 3/1999 | Su et al. ..................... 428/516 |
| 6,013,353 A | * | 1/2000 | Touhsaent ................... 428/203 |
| 6,190,760 B1 | * | 2/2001 | Nagai et al. ................ 428/213 |
| 6,326,068 B1 | * | 12/2001 | Kong et al. ................ 428/35.2 |
| 2002/0142116 A1 | | 10/2002 | Jud et al. .................... 428/35.3 |

* cited by examiner

*Primary Examiner*—Michael LaVilla
(74) *Attorney, Agent, or Firm*—Rick F. James; Keith A. Bell

(57) ABSTRACT

A metallized multilayer film structure includes a core layer of a film-forming polyolefin having a first side and a second side. A metal receiving skin layer may be disposed on the first side of the core layer. A metal layer may be deposited on the surface of the metal receiving skin layer opposite the core layer. A topcoat layer may be disposed on the surface of the metal layer opposite the metal receiving skin layer. A polymer skin layer may be disposed on the second side of the core layer. The film structure may optionally include one or more tie layers. The film structure may also optionally include a primer layer interposed between the topcoat layer and the metal layer. The present metallized multilayer film structure may be suitable for use as a monoweb to package product as opposed to being used in a lamination. The film structure exhibits superior scratch resistance and resistance to other types of damage. The film structure may be directly surface printed and then used to directly package product.

31 Claims, No Drawings

MONOWEB METALLIZED FILM SUITABLE FOR DIRECT SURFACE PRINTING

BACKGROUND

The invention relates to polymer films. More precisely, the present invention relates to multilayer, metallized polyolefin film structures that (a) exhibit excellent barrier properties, such as low water vapor transmission and low oxygen transmission properties, and (b) possess the necessary functionality both to protect the metallized layer and be receptive to surface printing and overlacquering, thereby rendering the present film structures (c) suitable for monoweb packaging applications.

Films to be used in food packaging applications desirably exhibit superior barrier properties that make the films as resistant as possible to the transmission of, for example, moisture and air.

Over the last decade, there has been an explosive growth in the use of metallized polymer films for packaging applications in general, and food packaging applications in particular. Metallized oriented polypropylene (OPP) and metallized oriented high-density polyethylene (OHDPE) exhibit improved food packaging properties, such as low light, oxygen, and water-vapor transmission properties, in comparison to unmetallized OPP and OHDPE. Packages made from metallized OPP or metallized OHDPE possess improved aesthetics due to their rich, metal-like appearance.

Typically, metallized OPP or metallized OHDPE is formed by vacuum depositing a thin layer, i.e. from about 100 Å to about 600 Å thick, of aluminum onto the surface of a clear OPP or OHDPE base film substrate. The deposited aluminum layer is particularly sensitive to damage, e.g. scratching, pinholes, and/or pickoff, and damage to the aluminum layer results in a deleterious effect on both the film's barrier properties and aesthetic properties.

Consequently, metallized OPP or metallized OHDPE films are conventionally used in an adhesive or polymount lamination, wherein the aluminum surface is protected by being buried in the lamination. For example, metallized OPP may be laminated to a clear OPP or oriented polyethylene terephthalate (OPET) film. Generally, the clear OPP or OPET film is reverse printed prior to being laminated to the metallized OPP. The printing allows for the necessary product details to be prominently displayed on the outside of the package. Thus, the reverse printed clear web faces the outside of the package and the metallized film with the aluminum layer buried in the lamination faces the inside of the package. Additionally, the surface of the metallized film opposite the aluminum surface is generally heat sealable or suitable for use with a cold seal, such that the finished package may be sealed to hold the product.

U.S. Pat. No. 5,194,318 discloses a metallized oriented film combination having a propylene polymer substrate with a high density polyethylene skin layer on at least one side thereof and a thin metal layer deposited on the surface of the high density polyethylene. The surface of these metallized oriented film combinations may be scratched and damaged resulting in a loss of barrier properties and aesthetics. Furthermore, the combinations are not directly suitable for surface printing.

U.S. Pat. No. 5,525,421 discloses a metallized film comprising an oriented polypropylene substrate having at least one surface coated with a vinyl alcohol homopolymer and a metal layer deposited thereon.

U.S. Pat. No. 5,591,520 discloses an oriented film combination of (a) a base layer of polypropylene, at least one surface of which comprises a maleic acid anhydride modified polypropylene; (b) on the at least one surface, a skin layer of an amorphous polyamide or a blend of an amorphous polyamide and a semicrystalline polyamide; and (c) a metal layer deposited on the polyamide skin layer. The surface of these oriented film combinations may be scratched and damaged resulting in a loss of barrier properties and aesthetics. Furthermore, the combinations are not directly suitable for surface printing.

U.S. Pat. No. 5,827,615 discloses a metallized multilayer film comprising either an OPP or an OHDPE core layer, maleic anhydride-modified polyolefin, which is either blended with the base polymer of the core layer or formed into an adhesion-promoting tie layer, and a metal receiving skin layer of an ethylene vinyl alcohol copolymer (EVOH), which is formed either on the maleic anhydride-modified polyolefin adhesion-promoting tie layer or on the maleic anhydride-containing core layer. A metal layer is deposited on the metal receiving skin layer. According to the '615 patent, it is essential to use a maleic anhydride-modified polyolefin in order to tie the core layer with the EVOH copolymer layer.

Application Ser. No. 09/490,477 filed Jan. 24, 2000, by Migliorini, et al., relates to improving the barrier properties of metallized films as opposed to the direct printability and scratch resistance of the metal deposit layer.

SUMMARY

There is provided a metallized multilayer film structure comprising:

(a) a core layer comprising a film-forming polyolefin selected from the group consisting of isotactic propylene homopolymer, high density polyethylene (HDPE), and linear low density polyethylene (LLDPE), the core layer having a first side and a second side;

(b) a metal receiving skin layer on the first side of the core layer, wherein the metal receiving skin layer comprises a film-forming polyolefin selected from the group consisting of high density polyethylene (HDPE), medium density polyethylene (MDPE), linear low density polyethylene (LLDPE), ethylene-propylene random copolymer, ethylene-propylene-butylene terpolymer, propylene-butylene copolymer, propylene homopolymer, and blends thereof;

(c) a metal layer deposited on the surface of the metal receiving skin layer opposite the core layer;

(d) a topcoat layer on the surface of the metal layer opposite the metal receiving skin layer, the topcoat layer comprising a coating selected from the group consisting of an ethylene acrylic acid copolymer (EM) coating, an ethylene methacrylic acid copolymer (EMA) coating, an acrylonitrile coating, a urethane coating, an epoxy coating, and blends thereof; and (e) a polymer skin layer on the second side of the core layer, the polymer skin layer comprising a film-forming polyolefin selected from the group consisting of ethylene-propylene random copolymer, ethylene-propylene block copolymer, ethylene-propylene-butylene terpolymer, and propylene-butylene copolymer.

There is also provided a metallized multilayer film structure comprising:

(a) a core layer comprising isotactic propylene homopolymer, the core layer having a first side and a second side;

(b) a tie layer on the first side of the core layer, the tie layer comprising a maleic anhydride-modified polypropylene or a maleic anhydride-modified ethylene-propylene copolymer;

(c) a metal receiving skin layer on the surface of the tie layer opposite the core layer, wherein the metal receiving skin layer comprises either a film-forming amorphous polyamide or a film-forming blend of an amorphous polyamide and one or more semicrystalline polyamides;

(d) a metal layer deposited on the surface of the metal receiving skin layer opposite the tie layer;

(e) a topcoat layer on the surface of the metal layer opposite the metal receiving skin layer, the topcoat layer comprising a coating selected from the group consisting of an acrylic coating, an ethylene acrylic acid copolymer (EAA) coating, an ethylene methacrylic acid copolymer (EMA) coating, an acrylonitrile coating, a polyvinylidene chloride (PVdC) coating, a polyvinyl alcohol (PVOH) coating, a urethane coating, an epoxy coating, and blends thereof; and (f) a polymer skin layer on the second side of the core layer, the polymer skin layer comprising a film-forming polyolefin selected from the group consisting of ethylene-propylene random copolymer, ethylene-propylene block copolymer, ethylene-propylene-butylene terpolymer, and propylene-butylene copolymer.

The present metallized multilayer film structure may optionally contain a primer layer interposed between the topcoat layer and the metal layer.

The present metallized multilayer film structure is suitable for use as a monoweb to package product as opposed to being used in a lamination. Specifically, the film structure may be formed into a package on heat seal type packaging machines, such as VFF&S packaging machines, without being laminated to a protective film and without causing a loss in barrier properties.

The film structure exhibits superior scratch resistance and resistance to other types of damage. The film structure may be directly surface printed and then used to directly package product.

Thus, the monoweb design of the film structure eliminates a lamination step and the costs associated therewith, e.g. machine time, direct labor, energy, outer web, and laminating adhesive. Because the greater proximity between the metal layer and the forming collar of, for example, a VFF&S packaging machine leads to a decreased bending radius, the monoweb design of the present metallized multilayer film structure greatly reduces the barrier degradation of the metal layer. In short, the monoweb design does not compromise the barrier properties and aesthetics of the film structure and protects the metal layer from scratching and other damage that may be incurred during subsequent processing, e.g. printing, slitting, packaging, distribution, and use.

DETAILED DESCRIPTION

The metallized multilayer film structure includes a core layer. The core layer comprises a film-forming polyolefin which has properties suitable for extrusion or coextrusion followed by uniaxial or biaxial orientation (by stretching the extrudate in the machine direction and/or transverse direction) under elevated temperatures so as to form a film. The film-forming polyolefin may be a propylene homopolymer or a propylene copolymer, i.e. a polyolefin made predominantly of propylene with minor amounts of another olefin, usually a $C_2$–$C_4$ olefin. For example, the film-forming polyolefin may be an isotactic propylene homopolymer which has an isotacticity of from about 93% to about 99%, a crystallinity of from about 70% to about 80%, and a melting point of about 145° C. or higher, e.g. up to about 167° C.

Alternatively, the film-forming polyolefin of the core layer may be a polyethylene. For example, the film-forming polyolefin of the core layer may be a high density polyethylene (HDPE) or a linear low density polyethylene (LLDPE). HDPE is a substantially linear polyolefin having a density of, for example, from about 0.952 g/cm$^3$ or higher, e.g. from about 0.952 g/cm$^3$ to about 0.962 g/cm$^3$, and a melting point of, for example, from about 130° C. to about 148° C. LLDPE has a density in the range of from 0.90 g/cm$^3$ to 0.94 g/cm$^3$, e.g. from 0.910 g/cm$^3$ to 0.926 g/cm$^3$, and a melt index of from about 1 to about 10 g/10 min. LLDPE may be derived from ethylene together with a minor amount of a higher olefin comonomer containing 4 to 10 carbon atoms, e.g. butene-1, hexene-1, or oxene-1.

If it is desired to produce an opaque film structure, void-initiating particles, i.e. cavitating agents, may be dispersed as filler in the core layer before extrusion and orientation of the core layer.

The void-initiating particles may be an organic or inorganic material that is incompatible with (the term "incompatible" is used in the sense that the materials are two distinct phases), and has a higher melting point than, the film-forming polyolefin of the core layer, at least at the orientation temperature. Examples of the void-initiating particles include polybutylene terephthalate (PBT), nylon, solid or hollow preformed glass spheres, metal beads or spheres, ceramic spheres, calcium carbonate, and combinations thereof.

The void-initiating particles may be present in the core layer in an amount of less than 30 wt %, for example from 1 wt % to 20 wt %, e.g. from 2 wt % to 10 wt %, based on the total weight of the core layer.

The mean particle size, i.e. average diameter, of the void-initiating particles may be from 0.1 to 10 μm, e.g. from about 0.75 to 2 μm. The void-initiating particles may be of any desired shape. For example, the void-initiating particles may be substantially spherical in shape.

Each particular void is not necessarily the same size. Generally, each void is of like shape when like void-initiating particles are used, even though each void may vary in size. The voids typically assume a shape defined by two opposed and edge-contacting concave disks.

The core layer comprising void-initiating particles as filler may be described as being a polymeric matrix within which is located a strata of voids. The voids create the matrix configuration. The term "strata" is intended to convey that there are many voids creating the matrix. Thus, the void-initiating particles constitute a dispersed phase throughout the lower melting film-forming polyolefin of the core layer and the polyolefin, upon orientation, will form a void-filled matrix with the void-initiating particles positioned within the voids.

Upon orientation of the core layer, a typical void of the core layer is defined as having major dimensions X and Y and minor dimension Z, wherein dimension X is aligned with machine direction orientation, dimension Y is aligned with transverse direction orientation, and dimension Z approximately corresponds to the cross-sectional dimension of the void-initiating particle. Typically, orientation conditions are such that the X and Y dimensions are the major dimensions in comparison to the Z dimension. For example, the two average major void dimensions X and Y may be greater than 30 µm.

Thus, while the Z dimension generally approximates the cross-sectional dimension of the void-initiating particle, the X and Y dimensions may be significantly greater. Indeed, the orientation temperature conditions may permit the X and Y dimensions to be at least several multiples greater than the Z dimension without causing void splitting.

The core layer may also comprise an opacifying agent. Examples of the opacifying agent include iron oxide, carbon black, titanium dioxide, talc, and combinations thereof. The opacifying agent may be present in the core layer in an amount of from 1 to 15 wt %, for example from 1 to 8 wt %, e.g. from about 2 to about 4 wt %, based on the total weight of the core layer. Aluminum is another example of an opacifying agent that may be used in the core layer of the present film structure. Aluminum may be included in the core layer as an opacifying agent in an amount of from 0.01 to 1.0 wt %, e.g. from about 0.25 to about 0.85 wt %, based on the total weight of the core layer.

The core layer may also comprise one or more hydrocarbon resins. The hydrocarbon resin(s) may be present in the core layer in a total amount of from 1 wt % to 15 wt %, for example from 1 wt % to 12 wt %, e.g. from 2 wt % to 6 wt %, based upon the total weight of the core layer.

The hydrocarbon resin(s) may be a low molecular weight hydrocarbon which is compatible with the film-forming polyolefin of the core layer. The hydrocarbon resin(s) may, optionally, be hydrogenated. The hydrocarbon resin(s) may have a number average molecular weight of less than 5,000, for example less than 2,000, e.g. from 500 to 1,000. The resin(s) can be natural or synthetic and may have a softening point in the range of from 60° C. to 180° C. An example of a hydrocarbon resin that may be contained in the present core layer include any of the hydrocarbon resins disclosed in U.S. Pat. No. 5,667,902 to Brew, et al., which is incorporated herein by reference. Specific examples include, but are not limited to, petroleum resins, terpene resins, styrene resins, and cyclopentadiene resins. Examples of commercially available hydrogenated resins include PICCOLYTE, REGALREZ, and REGALITE, each of which are available from Hercules Corp., and ESCOREZ, available from ExxonMobil Chemical Co.

A particular type of hydrocarbon resin that may be included in the core layer of the present film structure is a saturated alicyclic resin. Saturated alicyclic resins have a softening point in the range of from 85° C. to 140° C., for example from 1000 to 140° C., as measured by the ring and ball technique. An example of a commercially available saturated alicyclic resin is ARKON-P, available from Arakawa Forest Chemical Industries, Ltd. Of Japan.

The metallized multilayer film structure includes a metal receiving skin layer. The metal receiving skin layer may comprise a film-forming polyolefin having properties suitable for extrusion and uniaxial or biaxial orientation. The film-forming polyolefin may be selected from the group consisting of HDPE, MDPE, LLDPE, ethylene-propylene random copolymer, ethylene-propylene-butylene terpolymer, propylene-butylene copolymer, propylene homopolymer, and blends thereof.

In a particular embodiment of the present metallized multilayer film structure, the metal-receiving skin layer does not comprise a film-forming polyolefin.

Instead, the metal-receiving skin layer comprises either a film-forming amorphous polyamide or a film-forming blend of an amorphous polyamide and one or more semicrystalline polyamides. Specifically, the metal-receiving skin layer may comprise a film-forming amorphous polyamide such as, for example, amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidene, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine. Alternatively, the metal-receiving skin layer may comprise a film-forming amorphous polyamide such as, for example, amorphous polymers prepared from the following dicarboxylic acids: isophthalic acid, terephthalic acid, alkyl substituted iso- and terephthalic acid, adipic acid, sebacic acid, butane dicarboxylic acid, and the like.

Specific examples of amorphous polyamides that may serve as the metal-receiving skin layer include: hexamethylenediamine isophthalamide, hexamethylenediamine isophthalamide/terephthalamide terpolymer, having iso/terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediamine with iso- or terephthalic acids, or mixtures of these acids. Polyamides based on hexamethylenediamine iso/terephthalamide containing high levels of terephthalic acid moiety may also serve as the metal-receiving skin layer provided that a second diamine such as 2-methyidiaminopentane is incorporated to produce a processible amorphous polymer.

As explained above, the amorphous polyamide of the present invention may be blended with at least one semicrystalline polyamide. The term "semicrystalline polyamide" refers to the traditional semicrystalline nylons, which are generally prepared from lactams or amino acids, such as nylon 6 or nylon 11, or from condensation of diamines such as hexamethylene diamine with dibasic acids, such as succinic, adipic, or sebacic acids. Copolymers and terpolymers of these polyamides are also included, such as copolymers of hexamethylenediamine/adipic acid with caprolactam.

Additional examples of polyamides that may serve as the metal-receiving skin layer of the present invention include those amorphous polyamides and semicrystalline polyamides disclosed in U.S. Pat. No. 5,591,520 to Migliorini, et al, which is incorporated herein by reference.

In the embodiment wherein the metal-receiving skin layer comprises either a film-forming amorphous polyamide or a film-forming blend of an amorphous polyamide and one or more semicrystalline polyamides, the surface of the core layer is modified by a particular functionalized material. The functionalized material may be mixed into the core layer itself or applied as a tie layer in between the core layer and the polyamide metal-receiving skin layer in order to tie, i.e. promote strong adherence between, the core layer and the polyamide metal-receiving skin layer.

The functionalized material may be a maleic anhydride-modified polyolefin, such as, for example, a maleic anhydride-modified polypropylene or a maleic-anhydride-modified ethylene-propylene copolymer. Examples of the maleic anhydride-modified polyolefin that may be added to the film-forming polyolefin of the core layer or that may serve as a tie layer between the metal-receiving skin layer and the core layer include those maleic anhydride-modified polyolefins disclosed in U.S. Pat. No. 5,827,615 to Touhsaent, et al, which is incorporated herein by reference.

If the functionalized material is added to the film-forming polyolefin of the core layer, the functionalized material is generally present in an amount of, for example, less than 10 wt %, e.g. from about 0.5 wt % to about 1.5 wt %, based on the combined weight of the film-forming polyolefin of the core layer and the functionalized material.

The metallized multilayer film structure includes a polymer skin layer on the second side of the core layer. The polymer skin layer may comprise a film-forming polyolefin having properties suitable for extrusion and uniaxial or biaxial orientation. The film-forming polyolefin may be selected from the group consisting of ethylene-propylene random copolymer, ethylene-propylene block copolymer, propylene-butylene copolymer, and ethylene-propylene-butylene terpolymer.

As explained above, a tie layer comprising a functionalized material may be disposed between the core layer and the metal-receiving skin layer. Additionally, a tie layer may be disposed between the core layer and the polymer skin layer on the second side of the core layer. This additional tie layer may comprise a film-forming polyolefin selected from the group consisting of propylene homopolymer, ethylene-propylene random copolymer, ethylene-propylene block copolymer, propylene-butylene copolymer, and ethylene-propylene-butylene terpolymer.

The combination of (i) the core layer, (ii) the metal receiving skin layer on the first side of the core layer, (iii) the polymer skin layer on the second side of the core layer, and, in certain embodiments, (iv) one or more tie layers disposed between the core layer and the metal-receiving skin layer and/or between the core layer and the polymer skin layer, may be termed the polymer substrate of the present metallized multilayer film structure. The polymer substrate may be prepared by coextruding the particular polymers of each particular layer. After extruding the polymer substrate using conventional extrusion techniques, the film is heated and molecularly oriented in the longitudinal, i.e. machine, direction and, optionally, in the transverse direction. This uniaxial or biaxial orientation, which greatly improves the stiffness and tensile strength properties of the film, is accomplished by using conventional techniques to sequentially stretch the film from, for example, about 2 to 8 times in the machine direction and optionally, from about 5 to 12 times in the transverse direction, at a drawing temperature of from about 100° C. to about 200° C. For further information concerning biaxial orientation, see, for example, U.S. Pat. No. 5,885,721.

For some applications, it may be desirable to produce the polymer substrate by a cast film or chill roll extrusion process rather than a coextrusion and orientation process. In this case, the final polymer substrate is essentially nonoriented and the final metallized film is generally much less stiff than films in which the polymer substrate is prepared by a coextrusion and orientation process.

Before depositing the metal layer on the metal receiving skin layer, the surface of the metal receiving skin layer that is to receive the metal layer and/or the surface (opposite the core layer) of the polymer skin layer on the second side of the core layer may optionally be treated. For example, the metal receiving skin layer may be surface treated HDPE and the polymer skin layer on the second side of the core layer may be surface treated ethylene-propylene block copolymer.

The treatment may be flame treatment, corona discharge treatment, or plasma treatment. For example, the surface of the metal receiving layer may be treated to a surface tension level of at least about 35 dynes/cm, e.g. from about 38 to 55 dynes/cm, in accordance with ASTM Standard D2578-84.

In general, the thickness of the uncoated, oriented, and optionally surface treated polymer film substrate should be just enough to provide the necessary stiffness, such that after printing, the monoweb structure may be adequately conveyed through a packaging machine, i.e. VFF&S, HFF&S, multilane, etc., to package the product. For example, the present uncoated, oriented, and optionally surface treated polymer substrate produced by a coextrusion and orientation process may have a thickness of from about 0.5 to about 3.0 mil, for example, from about 0.7 to about 2.0 mil, e.g., from about 1.1 to about 1.5 mil.

The core layer may have a thickness of, for example, from about 75% to about 99% of the total polymer substrate thickness. The metal receiving layer may have a thickness of, for example, from about 1 to about 20% of the total polymer substrate thickness. The polymer skin layer may have a thickness of, for example, from about 1 to about 10% of the total polymer substrate thickness.

A metal coating layer is deposited on the outermost surface, i.e. the surface opposite the core layer, of the metal receiving layer. Application of a metal coating layer to the outermost surface of the metal receiving layer of the oriented, optionally surface treated polymer substrate may be accomplished by vacuum deposition, or any other metallization technique, such as electroplating or sputtering. The metal of the metal coating layer may be aluminum, or any other metal capable of being vacuum deposited, electroplated, or sputtered, such as, for example, gold, zinc, copper, or silver. The thickness of the deposited metal coating may be from about 5 to about 200 nanometers (nm), for example, from about 10 to 100 nm, e.g. from about 30 to about 80 nm.

The metallized multilayer film structure includes a topcoat layer. The topcoat layer protects the metal layer, thereby helping to retain not only the barrier properties of the metallized multilayer film structure but also the outstanding aesthetics. The topcoat layer also provides a surface amenable to surface printing, thereby eliminating the need for a converter to surface treat or prime the metal layer prior to printing. The topcoat layer may optionally impart added aesthetics to the film structure.

The topcoat layer may be a coating selected from the group consisting of an acrylic coating, an ethylene acrylic acid copolymer (EM) coating, an ethylene methacrylic acid copolymer (EMA) coating, an acrylonitrile coating, a polyvinylidene chloride (PVdC) coating, a polyvinyl alcohol (PVOH) coating, a urethane coating, an epoxy coating, and blends thereof.

An acrylic terpolymer comprising (1) from about 18 to 80 wt % of at least one $C_1$–$C_4$ alkyl methacrylate, (2) from about 18 to 80 wt % of at least one $C_1$–$C_4$ alkyl acrylate, and (3) from about 1 to about 15 wt % of at least one $\alpha,\beta$-ethylenically unsaturated carboxylic acid, based on the total weight of the terpolymer, is an example of an acrylic coating that may be used as the topcoat layer. The unsaturated acid may be, for example, acrylic acid, methacrylic acid, maleic acid, crotonic acid, itaconic acid, citraconic acid, or mixtures thereof.

As an example of either EMA, EAA, or acrylonitrile coatings, there is a coating comprising a copolymer of from about 10 to 35 wt % of an $\alpha,\beta$-ethylenically unsaturated carboxylic acid and from about 65 to 90 wt % of ethylene, an alkyl acrylate or methacrylate, acrylonitrile or mixtures thereof. The unsaturated acid may be, for example, acrylic acid, methacrylic acid, maleic acid, crotonic acid, itaconic acid, citraconic acid, or mixtures thereof. The copolymer may have a number average molecular weight (Mn) of, for example, from about 2,000 to about 50,000, e.g. from about 4,000 to 10,000.

A copolymer of from about 65 to 90 wt % of ethylene and from about 10 to 35 wt % of acrylic acid, e.g. from about 75 to 85 wt % of ethylene and from about 15 to 25 wt % of acrylic acid, is an example of an EM copolymer coating. On the other hand, a copolymer of from about 65 to 90 wt % of ethylene and from about 10 to 35 wt % of methacrylic acid, e.g. from about 75 to 85 wt % of ethylene and from about 15 to 25 wt % of methacrylic acid, is an example of an EMA copolymer coating.

A polymer comprising (1) at least about 50 wt % of vinylidene chloride, e.g. from about 75 to about 92 wt % of vinylidene chloride, (2) from about 2 to about 6 wt % of an $\alpha,\beta$-ethylenically unsaturated carboxylic acid, and (3) the remainder being $C_1$–$C_4$ alkyl acrylate or methacrylate, or acrylonitrile, is an example of a PVdC coating. The unsaturated acid may be, for example, acrylic acid, methacrylic acid, maleic acid, crotonic acid, itaconic acid, citraconic acid, or mixtures thereof. For further examples of PVdC coatings that may be used as the topcoat layer of the present invention, see, for example, U.S. Pat. No. 4,944,990 to Liu, et al., which is incorporated herein by reference.

The topcoat layer may be a PVOH coating. Examples of commercially available PVOH materials include VINOL 125, 99.3+% super hydrolyzed polyvinyl alcohol and VINOL 325, 98% hydrolyzed polyvinyl alcohol, each of which may be obtained from Air Products, Inc. For additional examples of PVOH coatings that may be used as the topcoat layer, see, for example, U.S. Pat. Nos. 4,927,689, 5,230,963, and 5,547,764, which are incorporated herein by reference.

The topcoat layer may be a urethane coating. Urethane topcoat materials which are suitable are well known in the art and include copolymers of a glycol, a propanoic acid, and a polyisocyanate, for example a copolymer of a polybutylene glycol, a dimethylolpropionic acid, and isophorone diisocyanate, e.g. a copolymer of $\alpha$-hydro-$\omega$-hydroxypoly(oxy-1,4-butanediyl), 3-hydroxy-2-(hydroxymethyl)-2-methylpropanoic acid, and 5-isocyanato-1-(isocyanatomethyl)-1,3,3-trimethylcyclohexane.

The reaction product of an epoxy resin and an acidified aminoethylated vinyl polymer, which is used as a hardener or curing agent, is an example of the epoxy coating that may be used as the topcoat layer. The contemplated epoxy resins are glycidyl ethers of polyhydroxy compounds. Typical polyhydroxy compounds which may be used include bisphenol A, ring substituted bisphenol A, resorcinol, hydroquinone, phenol-formaldehyde, novolac resins, aliphatic diols, such as ethylene glycol, propylene glycol, 1,4-butanediol, 1,6-hexane-diol, glycerol, lower alkyl hydantoins, and mixtures thereof. For example, the epoxy resins may be made by the glycidation reaction between epichlorohydrin and bisphenol A. Epoxy resins of this type are commonly classified by their epoxy equivalent weight (EEW), which is defined as the weight of resin in grams which contains one gram equivalent of epoxy groups. Resins with an EEW ranging from about 170 to about 280 may be used, e.g. from about 180 to about 210. U.S. Pat. No. 4,214,039 to Steiner, et al., which is incorporated herein by reference, contains further details on epoxy coatings.

It is to be understood that additives may be included with the coating of the topcoat layer.

For example, the topcoat layer may contain a dispersed wax, e.g. a relatively large particle size carnuba or microcrystalline wax, as an anti-blocking agent. Other examples of waxes include natural waxes such as paraffin wax, beeswax, japan wax, montan wax, etc., and synthetic waxes such as hydrogenated castor oil, chlorinated hydrocarbon waxes, long chain fatty acid amides, etc. The wax may be present in the coating in an amount of, for example, from about 2 to about 12 parts by weight per hundred parts of the total topcoat layer, e.g. from about 3 to about 5 parts by weight per hundred parts of the total topcoat layer.

In addition to functioning as an anti-blocking material, the wax when incorporated into the topcoat layer may also function to improve the "cold-slip" properties of the metallized multilayer film structures coated therewith. "Cold-slip" is the ability of a film to satisfactorily slide across surfaces at about room temperature.

The topcoat layer may also contain particulate materials, such as an amorphous silica or talc. For example, the presence of an amorphous silica may further reduce the tack of the topcoat layer at room temperature. Amorphous silica is composed of particles which are agglomerations of smaller particles and which have an average particle size of, for example, from about 2 to about 9 microns, e.g. from about 3 to about 5 microns. Amorphous silica may be present in the topcoat layer in an amount, for example, of from about 0.1 to about 2.0 parts by weight per hundred parts of the total topcoat layer, e.g. from about 0.2 to about 0.4 parts by weight per hundred parts of the total topcoat layer. Talc, on the other hand, may be present in the topcoat layer in an amount of, for example, from 0 to 2 parts by weight per hundred parts of the total topcoat layer.

The topcoat layer may further contain cross-linking agents, such as melamine formaldehyde resins. Cross-linking agents may be present in the topcoat layer in an amount of, for example, from 0 to about 20 parts by weight per hundred parts of the total topcoat layer.

Additionally, the topcoat layer may contain antistatic agents, such as poly(oxyethylene) sorbitan monooleate, in an amount of, for example, from 0 to about 6 parts by weight per hundred parts of the total topcoat layer, and an antibacterial agent.

The topcoat layer may impart added aesthetics to the present metallized multilayer film structure. In particular, the topcoat layer may be colored any desirable color by the addition of a coloring agent(s), such as a colored pigment or dye, to achieve a monoweb metallized film with a colored background, which may be especially useful for applications where an aluminum background behind the print is undesirable. By imparting a colored surface to the metallized multilayer film structure, these dyeing and pigmenting agents may obviate the need for a converter to put down 100% ink coverage of the desired background color.

Examples of coloring agents that may be used in the topcoat layer include (i) organic pigments and dyes, such as phthalocyanine, azo, condensed azo, azo lake, anthraquinone, perylene/perinone, indigo/thioindigo, isoindolinone, azomethineazo, dioxazine, quinacridone, aniline black, triphenylmethane and carbon black pigments, and (ii) inorganic pigments and dyes, such as titanium oxide, iron oxide, iron hydroxide, chrome oxide, calcinated spinel, chromic acid, chrome vermilion, iron blue, aluminum powder and bronze powder pigments. For example, a topcoat layer pigmented white with titanium oxide may be applied over the metal layer to provide a white background to later be printed on by a converter.

If a coloring agent(s) is added to the topcoat layer, the coloring agent(s) is generally present in an amount of, for example, from about 1 to about 20 wt %, e.g. from about 3 wt % to about 10 wt %, based on the total weight of the topcoat layer.

Before applying the topcoat layer to the metal layer of the metallized, multilayer film structure, the outermost surface, i.e. the surface opposite the metal receiving layer, of the metal layer may be treated to increase its surface energy, thereby ensuring that the topcoat layer will be strongly adherent to the metal layer and reducing the possibility of the topcoat layer being stripped or peeled away from the film. Any of the surface treatments previously mentioned may be employed.

For applications where even greater adherence is desired between the topcoat layer and the metal layer, i.e. greater than that resulting from surface-treatment alone of the metal layer, a primer coating layer may be interposed between the topcoat layer and the metal layer. The primer coating layer may be selected from the group consisting of an acrylic coating, a styrene acrylic coating, an EM coating, an EMA coating, a urethane coating, an epoxy coating, a poly(ethyleneimine) (PEI) coating, and a polyester coating.

The primer coating layer may be any of the acrylic coatings, EM coatings, EMA coatings, urethane coatings, or epoxy coatings discussed herein with respect to the topcoat layer.

The primer coating layer may be a styrene acrylic coating layer. For example, the primer coating layer may be a copolymer containing up to 90 wt % of styrene, up to 80 wt % of an alkyl acrylate, up to 15 wt % of methacrylic acid, and from 5 wt % to 25 wt % of an acrylamide which has been condensed with a solution of formaldehyde in n-butanol containing from 0.2 to 3 equivalents of formaldehyde for each amide group in the copolymer. Another example of a styrene acrylic primer coating layer is a 50% solid solution of a copolymer resin containing 38.5 parts of styrene, 44 parts of ethyl acrylate, 2.5 parts of methacrylic acid and 15 parts of acrylamide which has been condensed with 5.2 parts of formaldehyde in n-butanol.

The primer coating layer may be poly(ethyleneimine), which is applied as either an aqueous or organic solvent, e.g. ethanol, solution, or as a solution in a mixture of water and organic solvent, containing from about 0.1 to about 0.6 wt % of the imine.

The primer coating layer may be a polyester coating layer, such as, for example, a linear, water-dissipatable polyester having an intrinsic viscosity of at least about 0.1 as measured in a 60–40 parts by weight solution of phenol/tetrachloroethane at 25° C., and at a concentration of 0.5 gram of polyester in 100 ml of solvent. The polyester may contain substantially equimolar proportions of acid moiety repeating units (100 mol %) to hydroxy moiety repeating units (100 mol %) and the polyester may comprise repeating units of components (a), (b), (c) and (d), as follows, wherein all stated mole percentages are based on the total of all acid and hydroxy moiety repeating units being equal to 200 mol %: (a) from about 90 mol % to about 97 mol % isophthalic acid; (b) from about 3 to about 10 mol % 5-sulfoisophthalic acid; (c) from about 70 to about 85 mol % 1,4-cyclohexanedimethanol; and (d) from about 15 to about 30 mol % diethylene glycol.

The topcoat layer or the primer coating layer may be coated onto the metal layer, or the topcoat layer may be coated onto the primer coating layer, as an aqueous or organic, e.g. ethanol, ketone, ester, etc., solvent solution. Alternatively, the coating can be 100% solids based, i.e. a solvent-less coating, which means that there is no solvent to dry off. Typically, a solvent-less coating may be cured via, for example, an electron beam-process.

The topcoat layer or primer coating layer may be coated onto the metal layer, or the topcoat layer may be coated onto the primer coating layer, by coating application methods, such as, for example, rod, direct gravure (forward and reverse), offset gravure, slot die, air knife, roll, dipping, or spraying. Any excess solution can be removed by squeeze rolls, doctor knives, etc. The topcoat layer or primer coating layer may be applied in an amount such that there may be deposited, following drying, a smooth, evenly distributed layer of from about 0.1 to about 10 g/1000 sq. in., for example from about 0.1 to 3.0 g/1000 sq. in., e.g. from about 0.2 to about 1.0 g/1000 sq. in.

The topcoat layer or primer coating layer once applied onto the metal layer, or the topcoat layer once applied onto the primer coating layer, is subsequently dried by, for example, hot air convection, electron beam, or radiant heat, e.g. ultraviolet or microwave, thereby providing a coated film structure which may be used, for example, as a packaging film.

A printed ink pattern may be applied to the topcoat layer using, for example a conventional solvent-based ink composition. The printed pattern may be covered with an overlacquer to prevent the pattern from damage.

The following example further illustrates the present invention.

EXAMPLE 1

A three layer biaxially oriented film was prepared by coextruding and biaxially orienting an isotactic propylene homopolymer core layer, a high density polyethylene (HDPE) metal-receiving skin layer on one side of the core layer, and an ethylene-propylene-butene-1 terpolymer skin layer on the other side of the core layer. The three layer film HDPE metal-receiving skin layer was then flame surface treated and metallized by vacuum deposition of aluminum. The metallized film structure had a thickness of 120 gauge, an oxygen transmission rate (OTR) of 1.7 $cm^3/100$ $in^2/24$ hr, and a water vapor transmission rate (WVTR) of 0.015 g/100 $in^2/24$ hr.

The aluminum metal layer was then corona surface treated and a topcoat layer comprising a copolymer of ethylene and (meth)acrylic acid, e.g. Sipca 385813 (available from Sipca Co.), was applied thereon.

The topcoat layer of the metallized and topcoated multilayer film structure was surface printed with a polyurethane nitrocellulose blended ink, e.g. Sun Pyroflex ink (available from Sun Chemical) and overlacquered with a nitrocellulose overlacquer, e.g. Sipca 21101368NC HR OPV.

After the surface printing, the OTR of the film structure was measured to be 0.50 $cm^3/100$ $in^2/24$ hr and the WVTR of the film structure was measured to be 0.007 g/100 $in^2/24$ hr.

Thus, there was no deterioration in the film structure's barrier properties after surface printing. Moreover, the ink adhesion and scuff resistance were both excellent, with the ink adhesion being greater than 95%, as measured by a Scotch 610 tape test. In particular, a strip of Scotch 610 tape approximately 4 inches in length is smoothed out over the surface printed topcoat layer in the transverse direction. The tape strip is then peeled off at an angle of approximately 150 degrees, and the percentage of ink picked off is visually inspected and estimated.

The surface printed, topcoated, metallized film structure was subsequently run over the former of a Woodman VFF&S packaging machine to assess the barrier degradation performance after forming a package from the film structure. The OTR was measured to be 0.5 cm$^3$/100 in$^2$/24 hr and the WVTR was measured to be 0.01 g/100 in$^2$/24 hr.

Thus, there was virtually no deterioration in barrier properties after forming.

What is claimed is:

1. A metallized multilayer film structure comprising:
   (a) a core layer comprising isotactic propylene homopolymer, the core layer having a first side and a second side;
   (b) a metal receiving skin layer on the first side of the core layer, wherein the metal receiving skin layer comprises a film-forming polyolefin selected from the group consisting of high density polyethylene (HDPE), ethylene-propylene random copolymer, propylene-butylene copolymer, ethylene-propylene-butylene terpolymer, propylene homopolymer, and blends thereof;
   (c) a metal layer deposited on the surface of the metal receiving skin layer opposite the core layer;
   (d) a topcoat layer on the surface of the metal layer opposite the metal receiving skin layer, the topcoat layer comprising a coating and a coloring agent, wherein:
      the coating is selected from the group consisting of an ethylene acrylic acid copolymer (EAA) coating, an ethylene methacrylic acid copolymer (EMA) coating, an acrylonitrile coating, a urethane coating, an epoxy coating, and blends thereof, and
      the coloring agent is selected from the group consisting of phthalocyanine, azo, condensed azo, azo lake, anthraquinone, perylene/perinone, indigo/thioindigo, isoindolinone, azomethineazo, dioxazine, quinacridone, aniline black, triphenylmethane, carbon black, titanium oxide, iron oxide, iron hydroxide, chrome oxide, calcinated spinel, chromic acid, chrome vermilion, iron blue, aluminum powder and bronze powder; and
   (e) a polymer skin layer on the second side of the core layer, the polymer skin layer comprising a film-forming polyolefin selected from the group consisting of ethylene-propylene random copolymer, ethylene-propylene block copolymer, ethylene-propylene-butylene terpolymer, and propylene-butylene copolymer.

2. The metallized multilayer film structure of claim 1, wherein the core layer further comprises at least one additive selected from the group consisting of a cavitating agent selected from the group consisting of polybutylene terephthalate, calcium carbonate, and combinations thereof, an opacifying agent selected from the group consisting of iron oxide, carbon black, aluminum, titanium dioxide, talc, and combinations thereof, and a hydrocarbon resin selected from the group consisting of petroleum resin, terpene resin, styrene resin, cyclopentadiene resin, saturated alicyclic resin, and combinations thereof.

3. The metallized multilayer film structure of claim 2, wherein:
   the cavitating agent is present in the core layer in an amount of from 2 wt % to 10 wt %, based on the total weight of the core layer, and the cavitating agent has a mean particle size of from 0.1 μm to 10 μm; and/or
   the opacifying agent is present in the core layer in an amount of from 1 wt % to 8 wt %, based on the total weight of the core layer; and/or
   the hydrocarbon resin is present in the core layer in an amount of from 1 wt % to 12 wt %, based on the total weight of the core layer, and the hydrocarbon resin has a number average molecular weight of less than 5,000.

4. The metallized multilayer film structure of claim 1, wherein the metal layer (c) is vacuum-deposited aluminum and has a thickness of from 10 nm to 100 nm.

5. A metallized multilayer film structure comprising:
   (a) a core layer comprising a film-forming polyolefin selected from the group consisting of isotactic propylene homopolymer, high density polyethylene (HDPE), and linear low density polyethylene (LLDPE), the core layer having a first side and a second side;
   (b) a metal receiving skin layer on the first side of the core layer, wherein the metal receiving skin layer comprises a film-forming polyolefin selected from the group consisting of high density polyethylene (HDPE), medium density polyethylene (MDPE), linear low density polyethylene (LLDPE), ethylene-propylene random copolymer, ethylene-propylene-butylene terpolymer, propylene-butylene copolymer, propylene homopolymer, and blends thereof;
   (c) a metal layer deposited on the surface of the metal receiving skin layer opposite the core layer;
   (d) a primer coating layer on the surface of the metal layer opposite the metal receiving skin layer, the primer coating layer comprising a coating selected from the group consisting of an acrylic coating, a styrene acrylic coating, an EAA coating, an EMA coating, a urethane coating, an epoxy coating, a poly(ethyleneimine) (PEI) coating, and a polyester coating;
   (e) a topcoat layer on the surface of the primer coating layer opposite the metal layer, the topcoat layer comprising a coating selected from the group consisting of an ethylene acrylic acid copolymer (EAA) coating, an ethylene methacrylic acid copolymer (EMA) coating, an acrylonitrile coating, a urethane coating, an epoxy coating, and blends thereof; and
   (f) a polymer skin layer on the second side of the core layer, the polymer skin layer comprising a film-forming polyolefin selected from the group consisting of ethylene-propylene random copolymer, ethylene-propylene block copolymer, ethylene-propylene-butylene terpolymer, and propylene-butylene copolymer.

6. The metallized multilayer film structure of claim 5, wherein the core layer further comprises at least one additive selected from the group consisting of a cavitating agent selected from the group consisting of polybutylene terephthalate, nylon, solid glass spheres, hollow glass spheres, metal beads, metal spheres, calcium carbonate, and combinations thereof, an opacifying agent selected from the group consisting of iron oxide, carbon black, aluminum, titanium dioxide, talc, and combinations thereof, and a hydrocarbon resin selected from the group consisting of petroleum resin, terpene resin, styrene resin, cyclopentadiene resin, saturated alicyclic resin, and combinations thereof.

7. The metallized multilayer film structure of claim 6, wherein:
   the cavitating agent is present in the core layer in an amount of from 1 wt % to 20 wt %, based on the total weight of the core layer, and the cavitating agent has a mean particle size of from 0.1 μm to 10 μm; and/or the opacifying agent is present in the core layer in an amount of from 1 wt % to 15 wt %, based on the total weight of the core layer; and/or the hydrocarbon resin is present in the core layer in an amount of from 1 wt % to 15 wt %, based on the total weight of the core layer, and the hydrocarbon resin has a number average molecular weight of less than 5,000.

8. The metallized multilayer film structure of claim 5, wherein the topcoat layer further comprises a coloring agent selected from the group consisting of phthalocyanine, azo, condensed azo, azo lake, anthraquinone, perylene/perinone, indigo/thioindigo, isoindolinone, azomethineazo, dioxazine, quinacridone, aniline black, triphenylmethane, carbon black, titanium oxide, iron oxide, iron hydroxide, chrome oxide, calcinated spinel, chromic acid, chrome vermilion, iron blue, aluminum powder and bronze powder.

9. The metallized multilayer film structure of claim 5, wherein the metal layer (c) is vacuum-deposited aluminum and has a thickness of from 10 nm to 100 nm.

10. The metallized multilayer film structure of claim 5, wherein the metal layer (c) comprises aluminum, and the metal receiving skin layer (b) is surface-treated by either flame treatment, corona discharge treatment, or plasma treatment prior to having the metal layer (c) vacuum deposited thereon and/or the vacuum deposited metal layer (c) is surface-treated by either flame treatment, corona discharge treatment, or plasma treatment prior to having the primer coating layer (d) coated thereon.

11. A metallized multilayer film structure comprising:

(a) a core layer comprising isotactic propylene homopolymer, the core layer having a first side and a second side;

(b) a tie layer on the first side of the core layer, the tie layer comprising a maleic anhydride-modified polypropylene or a maleic anhydride-modified ethylene-propylene copolymer (c) a metal receiving skin layer on the surface of the tie layer opposite the core layer, wherein the metal receiving skin layer comprises either a film-forming amorphous polyamide or a film-forming blend of an amorphous polyamide and one or more semicrystalline polyamides;

(d) a metal layer deposited on the surface of the metal receiving skin layer opposite the tie layer;

(e) a topcoat layer on the surface of the metal layer opposite the metal receiving skin layer, the topcoat layer comprising a coating and a coloring agent, wherein:

the coating is selected from the group consisting of an acrylic coating, an ethylene acrylic acid copolymer (EAA) coating, an ethylene methacrylic acid copolymer (EMA) coating, an acrylonitrile coating, a polyvinylidene chloride (PVdC) coating, a polyvinyl alcohol (PVOH) coating, a urethane coating, an epoxy coating, and blends thereof, and the coloring agent is selected from the group consisting of phthalocyaninc, azo, condensed azo, azo lake, anthraquinone, perylene/perinone, indigo/thioindigo, isoindolinone, azomethineazo, dioxazine, quinacridone, aniline black, triphenylmethane, carbon black, titanium oxide, iron oxide, iron hydroxide, chrome oxide, calcinated spinel, chromic acid, chrome vermilion, iron blue, aluminum powder and bronze powder; and (f) a polymer skin layer on the second side of the core layer, the polymer skin layer comprising a film-forming polyolefin selected from the group consisting of ethylene-propylene random copolymer, ethylene-propylene block copolymer, ethylene-propylene-butylene terpolymer, and propylene-butylene copolymer.

12. The metallized multilayer film structure of claim 11, wherein the core layer further comprises at least one additive selected from the group consisting of polybutylene terephthalate, an opacifying agent selected from the group consisting of iron oxide, carbon black, titanium dioxide, and combinations thereof, and a hydrocarbon resin selected from the group consisting of petroleum resin, terpene resin, styrene resin, cyclopentadiene resin, saturated alicyclic resin, and combinations thereof.

13. The metallized multilayer film structure of claim 12, wherein:

the polybutylene terephthalate is present in the core layer in an amount of from 2 wt % to 10 wt %, based on the total weight of the core layer, and the polybutylene terephthalate has a mean particle size of from 0.1 $\mu$m to 10 $\mu$m; and/or the opacifying agent is present in the core layer in an amount of from 2 wt % to 4 wt %, based on the total weight of the core layer; and/or the hydrocarbon resin is present in the core layer in an amount of from 2 wt % to 6 wt %, based on the total weight of the core layer, and the hydrocarbon resin has a number average molecular weight of less than 5,000.

14. The metallized multilayer film structure of claim 11, wherein the metal layer (c) is vacuum-deposited aluminum and has a thickness of from 10 nm to 100 nm.

15. A metallized multilayer film structure comprising:

(a) a core layer comprising isotactic propylene homopolymer, the core layer having a first side and a second side;

(b) a metal receiving skin layer on the first side of the core layer, wherein the metal receiving skin layer is high density polyethylene;

(c) an aluminum metal layer deposited on the surface of the metal receiving skin layer opposite the core layer, the aluminum metal layer having a thickness of from 10 nm to 100 nm;

(d) a primer coating layer on the surface of the metal layer opposite the metal receiving skin layer, the primer coating layer comprising a coating selected from the group consisting of an acrylic coating, a styrene acrylic coating, an EAA coating, an EMA coating, a urethane coating, an epoxy coating, a poly(ethyleneimine) (PEI) coating, and a polyester coating;

(e) a topcoat layer on the surface of the primer coating layer opposite the metal layer, the topcoat layer comprising a coating selected from the group consisting of an ethylene acrylic acid copolymer (EAA) coating, an ethylene methacrylic acid copolymer (EMA) coating, an acrylonitrile coating, a urethane coating, an epoxy coating, and blends thereof; and (f) a polymer skin layer on the second side of the core layer, the polymer skin layer comprising a film-forming polyolefin selected from the group consisting of ethylene-propylene random copolymer, ethylene-propylene block copolymer, ethylene-propylene-butylene terpolymer, and propylene-butylene copolymer.

16. The metallized multilayer film structure of claim 15, wherein the core layer further comprises at least one additive selected from the group consisting of a cavitating agent, an opacifying agent, and a hydrocarbon resin.

17. The metallized multilayer film structure of claim 16, wherein:
   the cavitating agent is polybutylene terephthalate;
   the opacifying agent is selected from the group consisting of iron oxide, carbon black, titanium dioxide, and combinations thereof; and
   the hydrocarbon resin is selected from the group consisting of petroleum resin, terpene resin, styrene resin, cyclopentadiene resin, saturated alicyclic resin, and combinations thereof.

18. The metallized multilayer film structure of claim 17, wherein:
   the cavitating agent is present in the core layer in an amount of from 2 wt % to 10 wt %, based on the total weight of the core layer, and the cavitating agent has a mean particle size of from 0.1 µm to 10 µm; and/or
   the opacifying agent is present in the core layer in an amount of from 2 wt % to 4 wt %, based on the total weight of the core layer; and/or
   the hydrocarbon resin is present in the core layer in an amount of from 2 wt % to 6 wt %, based on the total weight of the core layer, and the hydrocarbon resin has a number average molecular weight of less than 5,000.

19. The metallized multilayer film structure of claim 15, wherein the topcoat layer further comprises a coloring agent selected from the group consisting of phthalocyanine, azo, condensed azo, azo lake, anthraquinone, perylene/perinone, indigo/thioindigo, isoindolinone, azomethineazo, dioxazine, quinacridone, aniline black, triphenylmethane, carbon black, titanium oxide, iron oxide, iron hydroxide, chrome oxide, calcinated spinel, chromic acid, chrome vermillion, iron blue, aluminum powder and bronze powder.

20. The metallized multilayer film structure of claim 15, wherein the HDPE metal receiving skin layer (b) is surface-treated by flame treatment prior to having the aluminum metal layer (c) vacuum deposited thereon and the vacuum deposited aluminum metal layer (c) is surface-treated by corona discharge treatment prior to having the primer coating layer (d) coated thereon.

21. The metalllized multilayer film structure of claim 15, wherein said topcoat layer (d) is printed and overlacquered.

22. A metallized multilayer film structure comprising:
   (a) a core layer comprising isotactic propylene homopolymer, the core layer having a first side and a second side;
   (b) a tie layer on the first side of the core layer, the tie layer comprising a maleic anhydride-modified polypropylene or a maleic anhydride-modified ethylene-propylene copolymer;
   (c) a metal receiving skin layer on the surface of the tie layer opposite the core layer, wherein the metal receiving skin layer comprises either a film-forming amorphous polyamide or a film-forming blend of an amorphous polyamide and one or more semicrystalline polyamides;
   (d) a metal layer deposited on the surface of the metal receiving skin layer opposite the tie layer;
   (e) a primer coating layer on the surface of the metal layer opposite the metal receiving skin layer, the primer coating layer comprising a coating selected from the group consisting of an acrylic coating, a styrene acrylic coating, an EAA coating, an EMA coating, a urethane coating, an epoxy coating, a poly(ethyleneimine) (PEI) coating, and a polyester coating;
   (f) a topcoat layer on the surface of the primer coating layer opposite the metal layer, the topcoat layer comprising a coating selected from the group consisting of an acrylic coating, an ethylene acrylic acid copolymer (EAA) coating, an ethylene methacrylic acid copolymer (EMA) coating, an acrylonitrile coating, a polyvinylidene chloride (PVdC) coating, a polyvinyl alcohol (PVOH) coating, a urethane coating, an epoxy coating, and blends thereof; and
   (g) a polymer skin layer on the second side of the core layer, the polymer skin layer comprising a film-forming polyolefin selected from the group consisting of ethylene-propylene random copolymer, ethylene-propylene block copolymer, ethylene-propylene-butylene terpolymer, and propylene-butylene copolymer.

23. The metallized multilayer film structure of claim 22, wherein the core layer further comprises at least one additive selected from the group consisting of polybutylene terephthalate, an opacifying agent selected from the group consisting of iron oxide, carbon black, titanium dioxide, and combinations thereof, and a hydrocarbon resin selected from the group consisting of petroleum resin, terpene resin, styrene resin, cyclopentadiene resin, saturated alicyclic resin, and combinations thereof.

24. The metallized multilayer film structure of claim 23, wherein:
   the polybutylene terephthalate is present in the core layer in an amount of from 2 wt % to 10 wt %, based on the total weight of the core layer, and the polybutylene terephthalate has a mean particle size of from 0.1 µm to 10 µm; and/or
   the opacifying agent is present in the core layer in an amount of from 2 wt % to 4 wt %, based on the total weight of the core layer; and/or
   the hydrocarbon resin is present in the core layer in an amount of from 2 wt % to 6 wt %, based on the total weight of the core layer, and the hydrocarbon resin has a number average molecular weight of less than 5,000.

25. The metallized multilayer film structure of claim 22, wherein the metal layer (d) is vacuum-deposited aluminum and has a thickness of from 10 nm to 100 nm.

26. A metallized multilayer film structure comprising:
   (a) a core layer comprising isotactic propylene homopolymer, the core layer having a first side and a second side;
   (b) a metal receiving skin layer on the first side of the core layer, wherein the metal receiving skin layer is high density polyethylene;
   (c) an aluminum metal layer deposited on the surface of the metal receiving skin layer opposite the core layer, the aluminum metal layer having a thickness of from 10 nm to 100 nm;
   (d) a topcoat layer on the surface of the metal layer opposite the metal receiving skin layer, the topcoat layer comprising a coating and a coloring agent wherein:
   the coating is selected from the group consisting of an acrylic coating, an ethylene acrylic acid copolymer (EAA) coating, an ethylene methacrylic acid copolymer (EMA) coating, an acrylonitrile coating, a polyvinylidene chloride (PVdC) coating, a polyvinyl alcohol (PVOH) coating, a urethane coating, an epoxy coating, and blends thereof, and
   the coloring agent is selected from the group consisting of phthalocyanine, azo, condensed azo, azo lake, anthraquin one, perylene/perinone, indigo/thioindigo, isoindolinone, azomethincazo, dioxazine, quinacridone, aniline black, triphenyimethane, carbon black, titanium oxide, iron oxide, iron hydroxide, chrome oxide, calcinated spinel, chromic acid, chrome vermilion, iron blue, aluminum powder and bronze powder; and (e) a polymer skin layer on the second side of the core layer, the polymer skin layer comprising a fun-forming polyolefin selected from the group consisting of ethylene-propylene random copolymer, ethylene-propylene block copolymer, ethylene-propylene-butylene terpolymer, and propylene-butylene copolymer.

27. The metallized multilayer film structure of claim 26, wherein the core layer further comprises at least one additive selected from the group consisting of a cavitating agent, an opacifying agent and a hydrocarbon resin.

28. The metallized multilayer film structure of claim 27, wherein:

the cavitating agent is polybutylene terephthalate;

the opacifying agent is selected from the group consisting of iron oxide, carbon black, titanium dioxide, and combinations thereof; and the hydrocarbon resin is selected from the group consisting of petroleum resin, terpene resin, styrene resin, cyclopentadiene resin, saturated alicyclic resin, and combinations thereof.

29. The metallized multilayer film structure of claim 28, wherein:

the cavitating agent is present in the core layer in an amount of from 2 wt % to 10 wt %, based on the total weight of the core layer, and the cavitating agent has a mean particle size of from 0.1 $\mu$m to 10 $\mu$m; and/or the opacifying agent is present in the core layer in an amount of from 2 wt % to 4 wt %, based on the total weight of the core layer; and/or the hydrocarbon resin is present in the core layer in an amount of from 2 wt % to 6 wt %, based on the total weight of the core layer, and the hydrocarbon resin has a number average molecular weight of less than 5,000.

30. The metallized multilayer film structure of claim 26, wherein the HDPE metal receiving skin layer (b) is surface-treated by flame treatment prior to having the aluminum metal layer (c) vacuum deposited thereon and the vacuum deposited aluminum metal layer (e) is surface-treated by corona discharge treatment prior to having the topcoat layer (d) coated thereon.

31. The metallized multilayer film structure of claim 26, wherein said topcoat layer (d) is printed and overlacquered.

* * * * *